United States Patent
Johnson et al.

(10) Patent No.: US 6,519,580 B1
(45) Date of Patent: Feb. 11, 2003

(54) DECISION-TREE-BASED SYMBOLIC RULE INDUCTION SYSTEM FOR TEXT CATEGORIZATION

(75) Inventors: David E. Johnson, Cortlandt Manor, NY (US); Frank J. Oles, Peekskill, NY (US); Tong Zhang, Yonkers, NY (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 09/589,397

(22) Filed: Jun. 8, 2000

(51) Int. Cl.[7] .......................... G06F 17/00; G06F 15/18
(52) U.S. Cl. .......................................... 706/47; 706/16
(58) Field of Search ...................................... 706/47, 16

(56) References Cited

FOREIGN PATENT DOCUMENTS

EP 0473864 A1 * 11/1992
JP 04-239972 * 8/1992

OTHER PUBLICATIONS

Hall et al, "Decision Tree Learning on Very Large Data Sets", IEEE International Conference on Systems, Man, and Cybernetics, Oct. 1998.*
Maria Zamfir Bleyberg, "Preserving Text Categorization Through Translation", IEEE International Conference on Systems, Man, and Cybernetics, Oct. 1999.*
S. Weiss, et al. "Maximizing Text–Mining Performance", IEEE Intelligent Systems, 14(4), pp. 63–69, 1999.
F. Willems, et al., "The Context–Tree Weighting Method: Basic Properties", IEEE Transactions of Information Theory, vol., 41, No. 3, May 1995.
Y. Yang et al., "A Comparative Study on Feature Selection in Text Categorization", in Proceedings of the Fourteenth International Conference in Machine Learning, (ICML '97), 1997.
T. Zhang, "Compression by Model Combination", Proceedings of IEEE Data Compression, DCC'98, pp. 319–328, 1998.

* cited by examiner

*Primary Examiner*—George B. Davis
(74) *Attorney, Agent, or Firm*—Whitham, Curtis & Christofferson, P.C.; Stephen C. Kaufman

(57) ABSTRACT

A method to automatically categorize messages or documents containing text. The method of solution fits in the general framework of supervised learning, in which a rule or rules for categorizing data is automatically constructed by a computer on the basis of training data that has beforehand been categorized, i.e., each training data item has been labeled with the categories to which it belongs. More specifically, the method for rule induction involves the novel combination of (1) inducing from the training data a decision tree for each category, (2) automated construction from each decision tree of a simplified symbolic rule set that is logically equivalent overall to the decision tree, and which is to be used for categorization instead of the decision tree, and (3) determination of a confidence level for each rule. The method covers both decision-tree-based symbolic rule induction and the use for the purpose of document categorization of rules in the logical format of those generated by the rule induction procedure described herein.

21 Claims, 8 Drawing Sheets

DECISION-TREE-BASED SYMBOLIC RULE INDUCTION SYSTEM FOR TEXT CATEGORIZATION

CROSS-REFERENCE TO RELATED APPLICATION

This application is related in subject matter to the disclosure of U.S. patent application Ser. No. 09/589,348 file concurrently herewith by Frederick Damerau and David E. Johnson for "Categorization Based Text Processing" and assigned to a common assignee herewith. The disclosure of the subject matter of U.S. patent application Ser. No. 09/589,348 is incorporated herein by reference.

DESCRIPTION

BACKGROUND OF THE INVENTION

1. Field of the Invention

The present invention generally relates to supervised learning as applied to text categorization, and, more particularly, to a method for categorizing messages or documents containing text.

2. Background Description

The text categorization problem is to determine predefined categories for an incoming unlabeled message or document containing text based on information extracted from a training set of labeled messages or documents. Text categorization is an important practical problem for companies that wish to use computers to categorize incoming email, thereby either enabling an automatic machine response to the email or simply ensuring that the email reaches the correct human recipient. Beyond email, text items to be categorized may come from many sources, including the output of voice recognition software, collections of documents (e.g., news stories, patents, or case summaries), and the contents of web pages.

For the purposes of the following description, any data item containing text is referred to as a document, and the term herein is to be taken in this most general sense.

Previous text categorization methods have used decision trees, naive Bayes classifiers, nearest neighbor methods, neural nets, support vector machines and various kinds of symbolic rule induction.

The present invention relates to symbolic rule induction systems, so such systems will now be described at a general level that is known in the art. In such a system, data is represented as vectors in which the components are numerical values associated with certain features of the data. The system induces rules from the training data, and the generated rules can then be used to categorize arbitrary data that is similar to the training data. Each rule ultimately produced by such a system states that a condition, which is usually a conjunction of simpler conditions, implies membership in a particular category. The condition forms the antecedent of the rule and the conclusion posited as true when the condition is satisfied is the consequent of the rule. Usually, a data item is represented as a vector of numerical components, with each component corresponding to a possible feature of the data, and antecedent of a rule is combination of tests to be done on various components. Under a scenario in which features are words that may appear in a document and the corresponding numerical values in vectors representing documents are word counts, an example of a rule is $$\text{share}>3 \ \& \ \text{year}<=1 \ \& \ \text{acquire}>2 \rightarrow \text{acq}$$

which may be read as "if the word 'share' occurs more than three times in the document and the word 'year' occurs at most one time in the document and the word 'acquire' occurs more than twice in the document, then classify the document in the category 'acq'." Here the antecedent is $$\text{share}>3 \ \& \ \text{year}<=1 \ \& \ \text{acquire}>2$$

and the consequent is acq. Alternatively, the rule above could be read as "if words equivalent to 'share' occur more than three times in the document and words equivalent to 'year' occur at most one time in the document and words equivalent to 'acquire' occur more than twice in the document, then classify the document in the category 'acq'." This later reading of the rule reflects an assumption that stemming was done. Stemming is the replacement of words by corresponding canonical forms (or stems). Existing symbolic rule induction systems do not categorize documents accurately enough for many commercial applications, or their training time is excessive, or both.

SUMMARY OF THE INVENTION

It is therefore an object of the present invention to provide a method to automatically categorize messages or documents containing text. The hitherto unsolved practical problem in the field of text categorization is to provide a general text categorization system that in turn provides superior performance in six different ways. These six aspects, which will be explained in more detail below, are:

1. precision,
2. recall,
3. provision for multiple categorization,
4. provision of confidence levels,
5. training speed, and
6. insight and control.

Previous systems fall short on one or more of these desired features. The present invention solves this problem by delivering high performance or providing required functionality in each way.

Precision and recall (1 and 2) are basic measures of the performance of a categorizer. Precision is the proportion of the decisions to place documents in specific categories made by a text categorization system that are correct. Recall is the proportion of the actual category assignments that are identified correctly by a text categorization system. Precision and recall are much more useful measures of performance in the area of text categorization than the error rate, which is commonly used in most other areas of machine learning. This is because, in text categorization, one typically has many small categories, and so one could obtain a categorizer with a low error rate by simply using a categorizer that placed no document in any category, but such a categorizer would have very little practical utility. Of course, there is a connection between a categorizer's error rate, on one hand, and a categorizer's recall and precision, on the other because one cannot simultaneously have excellent recall and precision along with a poor error rate.

Multiple categorization (3) is the possibility for a single document to be assigned to more than one category. This is an essential kind of flexibility needed in many applications. However, a text categorization system that provides for multiple categorization is well-served by a method for assessing the significance of more than one category being assigned to a document. Such a method is the provision of confidence levels (4).

Confidence levels are quantified relative indicators of the level of confidence that may be placed in a categorizer's recommendations. Confidence levels are real numbers typically ranging from 0.0 to 1.0 inclusive, with 0.0 indicating lowest confidence and 1.0 indicating greatest confidence. Confidence levels are particularly important in practical applications of text categorization such as routing email or sending automatic responses to email. Applications of this method should make significant use of confidence levels in evaluating possible alternatives related to a categorizer's assignment of categories to a document. However, previous symbolic rule induction text systems for text categorization have not provided confidence levels as part of the rules.

Training speed (5) refers to the time it takes for a computer to generate a categorizer from training data.

Finally, insight and control (6) refers to the ability of people to understand and modify manually a text categorizer. This is extremely important in real commercial applications in which enterprises frequently have gaps in the coverage of their training data. Inability to compensate for a gap in data coverage could doom a text-categorization-dependent application, such as routing or automatically responding to email. Approaches used in the prior art for text categorization preclude manual intervention. One corollary to the desire for insight and control is that the justifications for a text categorization system's recommendations should be a simple as possible.

According to the invention, a method of solution fits in the general framework of supervised learning, in which a rule or rules for categorizing data is automatically constructed by a computer on the basis of training data that has been labeled with a predefined set of categories beforehand. More specifically, the method for rule induction involves the novel combination of:

1. inducing from the training data a decision tree for each category;
2. the automated construction from each decision tree of a simplified symbolic rule set that is logically equivalent overall to the decision tree, and which is to be used for categorization instead of the decision tree; and
3. the determination of a confidence level for each rule.

The method covers both decision-tree-based symbolic rule induction and the use for the purpose of document categorization of rules in the logical format of those generated by the rule induction procedure described herein.

A simplified rule set in the present context, is a relative concept. In other words, a rule set is simpler than one that is directly to be read from a decision tree by traversing all the paths from the root to the leaves. Of course, in some cases, an algorithm for computing a simplified rule set may fail to do any actual simplification, particularly if the rule set comes from a very simple decision tree. However, most decision trees induced to categorize text are not so simple and contain dozens or hundreds of tests. It should be noted that an individual rule in a rule set logically equivalent to a decision tree need not necessarily be logically equivalent to a single branch of the decision tree that was the basis for the rule set. The present method for simplifying a rule set takes advantage of this fact, while still producing a rule set equivalent to a decision tree in overall effect.

The logical format of the rules produced and used by this method is more general than that of other methods, in that the rules may include confidence levels. Thus, the rules produced by the rule induction part of this method are in the format of an antecedent, a consequent, and a confidence level. An example of a rule that can be produced by this method is share>3 & year<=1 & acquire>2 acq @0.75 which, under the assumption that stemming is done, may be read as, "if words equivalent to 'share' occur more than three times in the document and words equivalent to 'year' occur at most one time the document and words equivalent to 'acquire' occur more than two times in the document, then classify the document in the category 'acq', with a confidence level of 0.75."

Certainly for text categorization, the use of this logical format for rules, suitably understood, is novel. To see this, confidence levels are distinguished, as they are used here, from related concepts that have preceded them. First, the present method calls for confidence levels to be computed individually for each rule, and so, since individual rules are not necessarily equivalent to branches of the decision tree from which they were derived, confidence levels will differ from conventional estimates of the probability of category membership corresponding to branches of the decision tree. Second, a confidence level for an individual rule is more fine-grained than, and should not be confused with, an overall estimate of the probability that a particular document belongs to a particular category. The latter concept is connected with all the rules that may apply to a document, and there may be many of them. Although the two concepts are not unconnected, confidence levels for individual rules are more useful because a practical actions based on categorization decisions could well make use of the nature of the specific rule that gave rise to a categorization decision and its specific confidence level.

While the rule induction technique of this method will always produce rules with confidence levels, in the course of categorizing documents it could be possible to encounter rules from which the confidence level is missing. This could happen because an automatically generated rule set might have been modified, augmented, or replaced by hand-edited rules. Handwritten supplementary rules, as well as hand-edited replacements for machine generated rules, might well be missing confidence levels. If rules missing confidence levels are encountered in the course of categorizing documents, those rule will be treated as though they possess some default confidence level. Normally the default confidence level is taken to be 1.0, assuming the range of confidence levels is from 0.0 to 1.0 inclusive.

Moreover, the rules produced by this method may involve more complicated features than simply single occurrences of words anywhere in a document. In particular, if the sections of a document in which a feature may occur are deemed significant, then an example of a rule might be body|trade>3 & title|trade=0→trade @0.87

Under the assumption that stemming is being done, a reading of the last rule is as follows: "If words equivalent to 'trade' occur more than three times in the body section and if no word equivalent to 'trade' occurs in the title section, then the document can be assigned to the category trade with a confidence level of 0.87.

Alternatively, if sections of a document are deemed to be significant, but one wishes to have only one feature for a given word, then the numerical value for that feature may be taken to be a weighted combination of the word counts from the different sections. When such a rule is used in document categorization, the same weighted combination of word counts must be used in determining if the rule fires as was used in training when the rule was induced.

The unique technique of this method that, for the purpose of text categorization, integrates decision trees, simplified logically equivalent symbolic rule sets, and confidence levels is a mark of novelty.

In an alternative embodiment, the present invention uses a novel algorithm for decision tree induction that is very fast and effective for training on text data as a component of a text categorization system. There is a novel combination of three major innovations in the algorithm for decision tree induction:
1. In growing the tree, advantage is taken of the sparse structure of the data, as is the case generally for text data.
2. Also in growing the tree, modified entropy is used in the definition of the cost function that measures the impurity of a split (a key computation that guides decision tree induction).
3. Tree smoothing is used to prune the decision tree.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
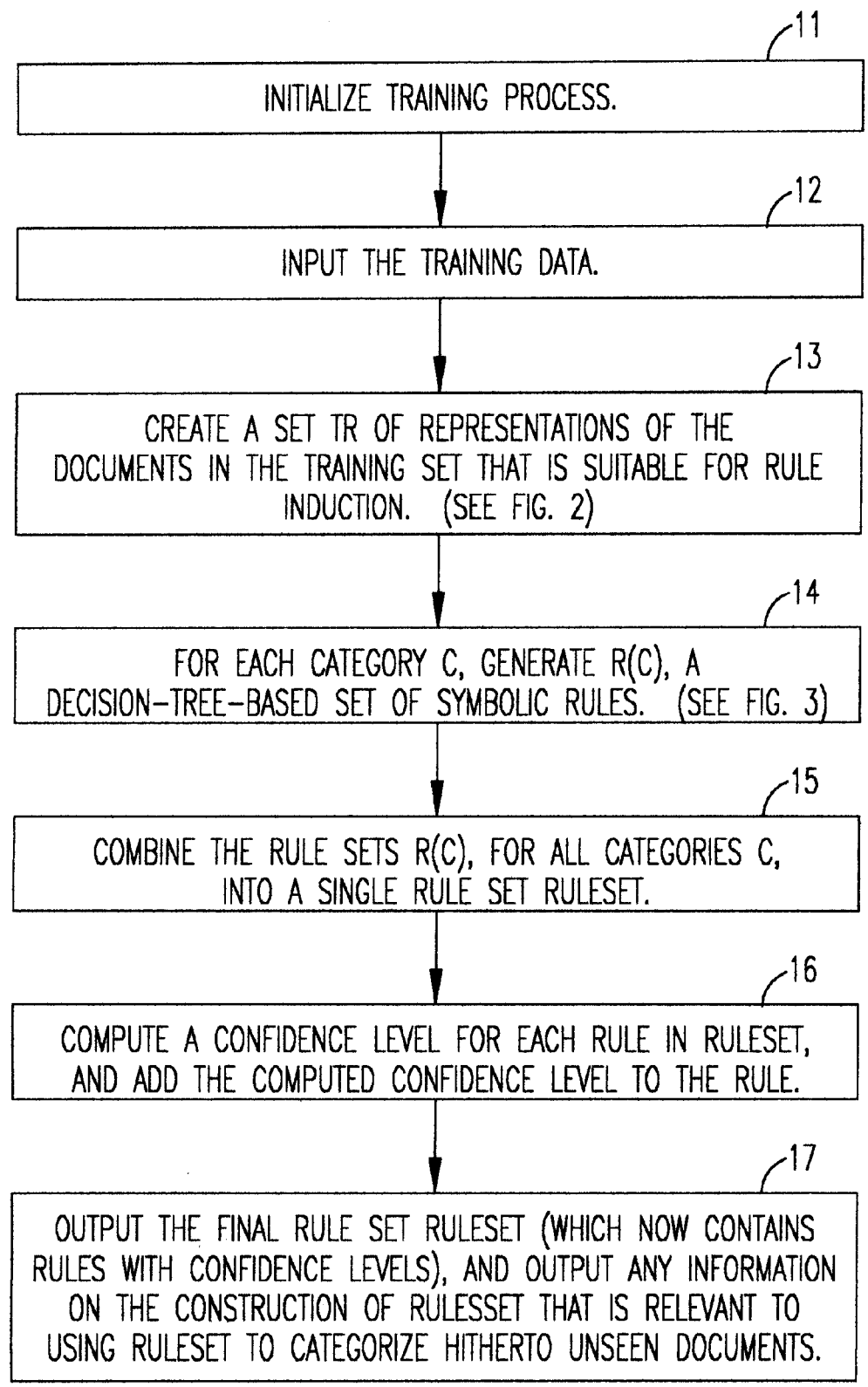
FIG. 1 is a flow diagram showing the steps that to be carried out to induce a decision-tree-based set of symbolic rules, with confidence levels, from a set of categorized training documents, labeled with respect to a category scheme, said rule set having the potential to be used for categorizing arbitrary, hitherto unseen, documents with respect to the same category scheme.
Figure 4:
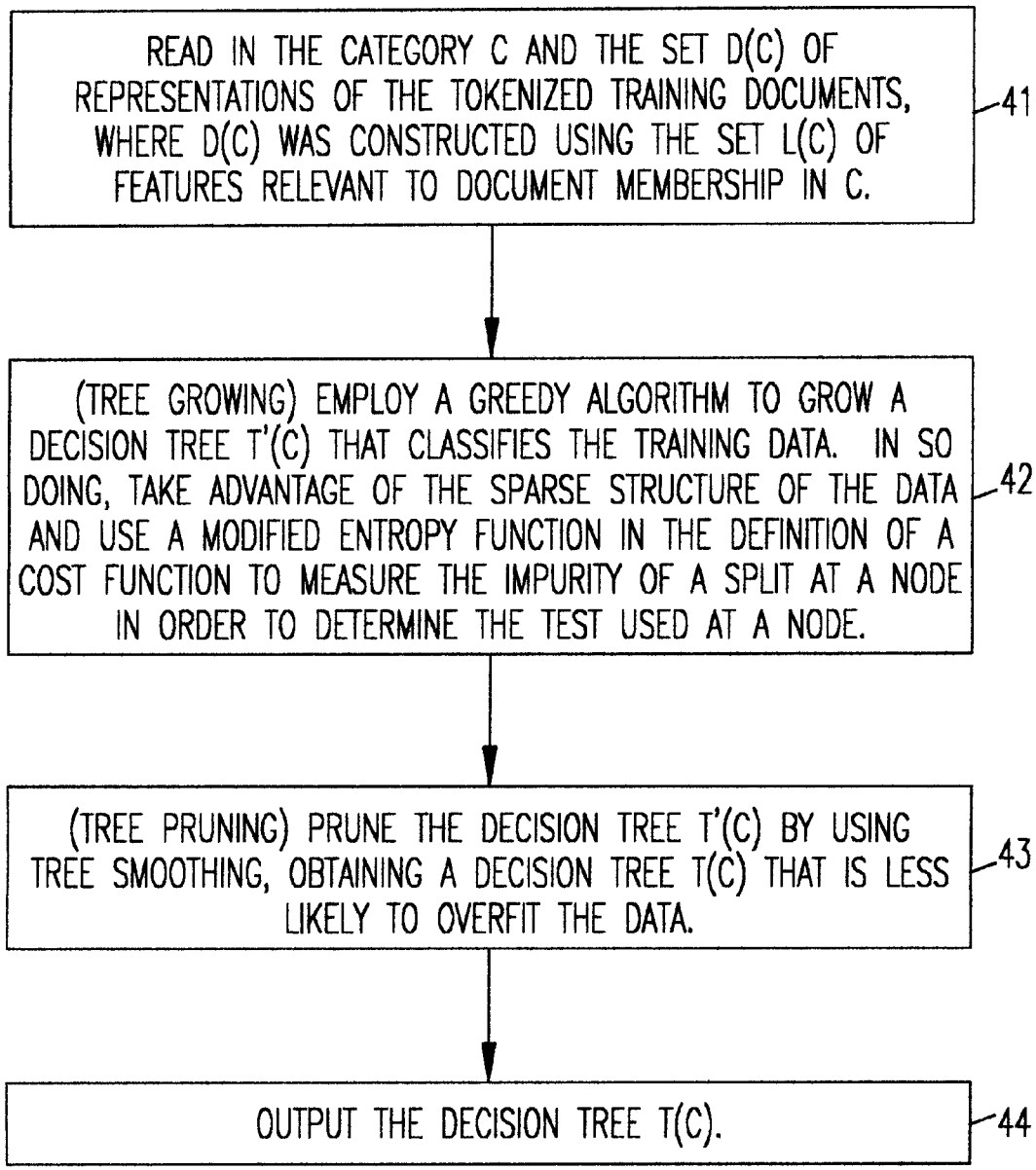
FIG. 4 is a flow diagram showing steps the may be taken to induce a decision tree T(C) for a category C using a set D(C) of representations of tokenized documents of a training set, the representation being based on the selection of a set L(C) of features deemed relevant to deciding whether or not a document is in category C.
Figure 8:
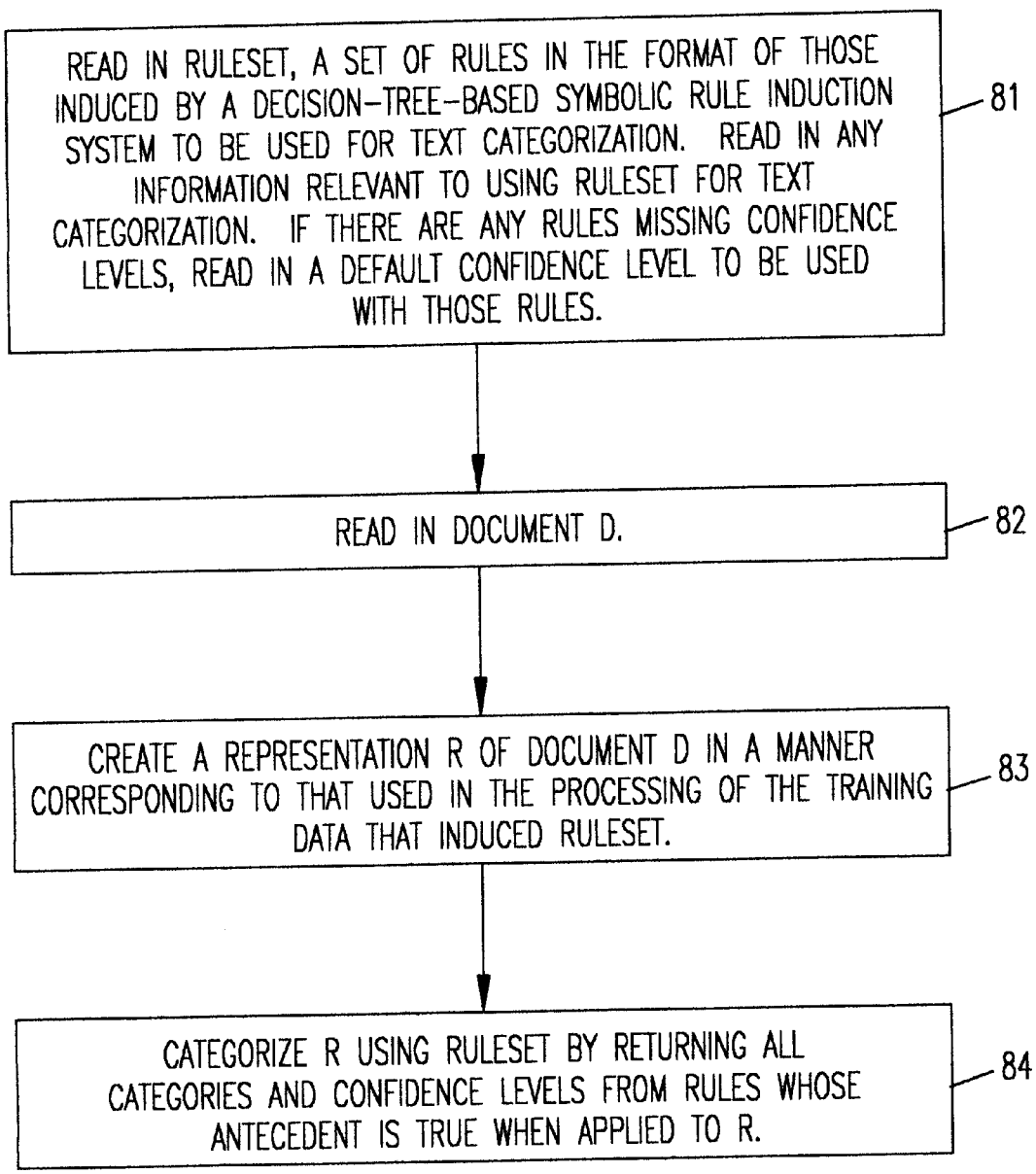
FIG. 8 is a flow diagram showing the steps to be carried out for the purpose of using a set of rules for membership in a category, in the format of those produced by a decision-tree-based symbolic rule induction system (i.e, possibly with confidence levels), to predict whether or not an uncategorized document is or is not in that category, delivering a confidence level with that prediction.

Referring now to the drawings, and more particularly to FIG. 1, there is shown a means for developing a categorizer. A means well suited to text data to induce decision trees, is shown in FIG. 4, and a means by which the categorizer is to be used to categorize documents, is shown in FIG. 8.

Principal Steps in the Rule Induction Procedure

The steps to be taken by a computer in creating a rule set for a category scheme from labeled training data are shown in FIG. 1. Referring to FIG. 1, first, the training processes is initialized in process block 11. This is meant to include supplying whatever values for any parameters that are needed by any of the following steps. For instance, such a parameter might be a maximum number of features to be put into a list of selected features as part of feature selection (FIG. 3, block 33), which is part of the process performed in block 15. Another parameter that might be supplied in would be information on the format of the data such as
1. a list of sections of a document that are relevant to rule induction; and
2. information on the location in the training data— perhaps an XML (eXtensible Markup Language) tag— where to find the categories to which a document belonged.

Other parameters might be weights for word counts from various sections of documents if variable weights were used. Another parameter might specify the details of tokenization (as described in function block 13), e.g., where a dictionary of canonical forms for words could be found. Another parameter might specify whether stopwords (common words thought to be unimportant to rule induction) were to be eliminated from documents as part of tokenization (function block 13). Many of the initialization settings would likely would be part of the output in function block 17 of information on the construction of the induced rule set that is relevant to using the induced rule set to categorize hitherto unseen documents. The exact nature of data to be provided during initialization would depend on the implementation details of a particular embodiment of the invention.

Once the training process has been initialized, the training data is input in function block 12. The training data is assumed to be labeled by categories according to some categorization scheme.

Figure 2:
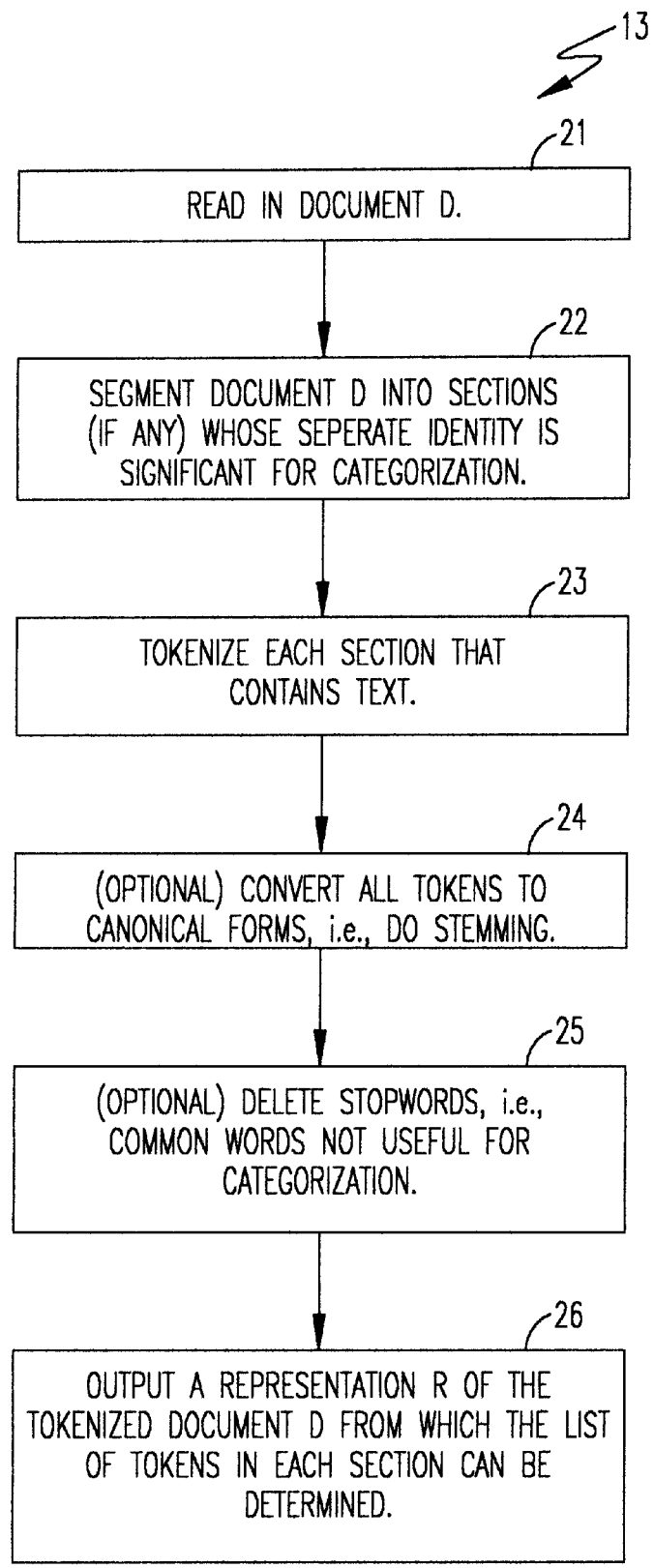
FIG. 2 is a flow diagram showing the steps that to be taken in tokenizing and subsequently determining a representation of a text document.

A set TR of representations of the training documents that is suitable for rule induction is created in function block 13. Tokenization of each document in the training data is the primary purpose of this step. "Tokenization" means extracting a sequence of words or tokens from a sequence of characters. The details of what must be done to each document in this step are shown in FIG. 2, to be discussed below.

A decision-tree-based set R(C) of symbolic rules for each category C is generated in function block 14. Since the rule sets are to be generated on a per category basis, there is no insistence that a document belong to at most one category, so that multiple categorization is intrinsically supported by this method. One way to generate a decision-tree-based set of symbolic rules for a category C is presented in a separate flow chart shown in FIG. 3, the details of which will be discussed in a later section.

The rule sets for all the categories are combined into a single rule set, referred to herein as RuleSet in function block 15.

A confidence level for each rule in RuleSet is computed in function block 16. There are various ways to do this. One way to compute a confidence level is to user the precision of each individual rule as measured on a set of data which has been labeled with categories as the confidence level. The data set used here may be either the training data used earlier for rule induction or it may be a separate data set put aside for the purpose of measuring the confidence levels of the rules in a fashion that does not depend on the training data. For text data, the use of rule-specific precision as a confidence level is preferable to using accuracy, the normal machine learning measure. One should note that the determination of the confidence levels for rules does not necessarily need to be done at this stage. It could have been done on a per category basis in the performance of function block 15.

The RuleSet is then output in function block 17, in which the rules now have confidence levels, along with outputting any information relevant to using RuleSet to categorize hitherto unseen documents. Such additional information would be used to process any documents to which the rules are to be applied in a manner parallel to the manner in which the training data was processed in function block 13.

Converting Documents to Suitable Representations

As noted above, the overall rule induction process calls for the creation of a suitable representation—principally by tokenization—of the documents in the training set. Also, similar processing of documents being categorized is called for in the rule application process. This functionality is common to most methods of text categorization. However, empirical evidence showed that the performance of this method can be affected by the decisions made with regard to how documents are to be represented. Thus, document representation needs to be fully explicated in a description of this method. The basic steps are shown in FIG. 2.

Referring now to FIG. 2, there is shown a flow diagram of the steps to be taken in tokenizing and subsequently determining a representation of a text document. First, a document d is read in function block 21. The document is then segmented into sections, if any, whose separate identity is deemed significant for categorization in function block 22. For instance, it may be desirable to keep the header separate from the body of a document, in which case a word extracted from the header would give rise to a different feature from the same word extracted from the body.

Each section that contains text is tokenized in function block 23. Function blocks 24 and 25 are optional. However, executing these steps may improve performance. In function block 24, all tokens are converted to canonical forms, i.e., stemming, is done. "Stemming" is the replacement of a word by its stem or canonical form, as in replacing plural nouns with corresponding singular nouns. In function block 25, stopwords, i.e., common words not deemed useful for categorization, are deleted. For example, the articles "a", "an", and "the", as well as prepositions, are often found on stopword lists. If both function blocks 24 and 25 are performed, they may be performed in either order, because neither has logical precedence over the other, as long as one realizes that the right stopword list to use may be affected by whether stopword elimination comes before or after stemming. Also, the elimination of stopwords may in some instances be logically subsumed by subsequent feature selection.

Finally, in function block 26, the process outputs a representation of a tokenized document from which the list of tokens in each section can be determined, as well as from which any useful statistical measures relating to token occurrences can be computed. As a minimum, the number of occurrences of any token in document section deemed significant for categorization should be computable from the representation.

Rule Induction for a Particular Category

Figure 3:
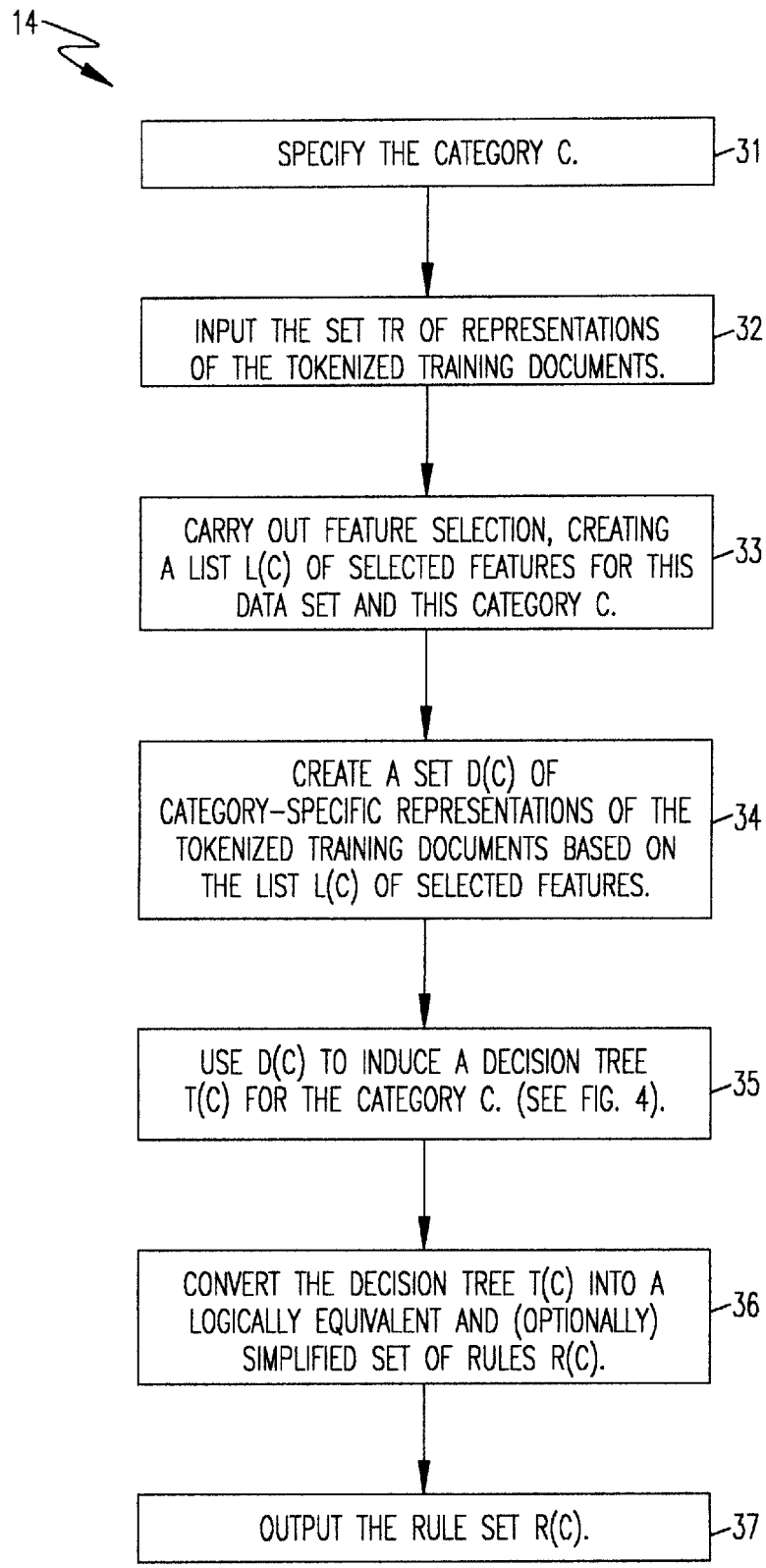
FIG. 3 is a flow diagram showing the steps to be carried out in constructing a decision-tree-based set of symbolic rules, with confidence levels, for a specific category C, using a set TR of representations of the tokenized training documents.

The steps that may be taken by a computer in order to induce a decision-tree-based symbolic rule set for a particular category of documents from a set of representations of documents in a training set are described below. This process corresponds to function block 14 of FIG. 1. Referring now to FIG. 3, a single category C for which a set of decision-tree-based symbolic rules is to be induced is read in function block 31. A set TR of representations of tokenized training documents is then read in function block 32. This is the data for the rule induction process, and the outcome of the process is dependent on the decisions made earlier about how the data would be represented.

The computer carries out feature selection in function block 33, i.e, the selection of a set L(C) of features from the collection of all features occurring in the TR (the set of all representation of tokenized training documents) in order to construct a representation of each document that is specific to the category C. Usually, the representation of a document that is specific to the category C will be a numerical vector representation of the document, with each component of the vector being a numerical value corresponding to some single specific feature in L(C). For each category C, the set of features selected L(C), and, hence the exact representation of a document, will be different. These separate feature sets are known as local dictionaries. The use of local dictionaries enables the resulting categorization system to provide superior performance as measured by precision and recall, because the features used in decision tree induction for a particular category can be optimized for that particular category. In the preferred embodiment, 500 features per category are typically selected, although clone experiments were performed using 10,000 or more. For each class, the information gain (IG) criterion given in Y. Yang and J. D. Pedersen, "A Comparative Study of Feature Selection in Text Categorization", in *Proceedings of the Fourteenth International Conference in Machine Learning (ICML '97)*, 1997, can be used as the feature selection method. The IG criterion works well even when stopwords have not been removed from the tokenized representations of documents. Other methods are possible, such as simply taking the most frequent features appearing in documents belonging to the category. The performance of the last mentioned technique will work better when stopwords have been removed from the tokenized representations of documents.

However, feature selection could be greatly simplified in the event that the total number of different tokens occurring in the document set was moderate in light of the computing resources available, and tokens were to be taken by themselves to be the sole features of interest. In this case, one would use as feature selection the simpler process of assembling a list of all features that occur in the training data.

In function block 34, the computer should use the set L(C) of features selected for relevance for deciding document membership in category C to create a set D(C) of representations of all tokenized training documents that is specific to the category C. Usually the representations in D(C) will be numerical vectors. In the numerical vector representation of a document that is specific to the category C, each component of the vector is a numerical value corresponding to some single specific feature in L(C). Thus, the representation of a training document in D(C) will typically be much smaller than the representation of the same document in TR. One way to represent a document of the purpose of inclusion in D(C) is to limit the numerical components of a vector to being one of the consecutive integers 0, 1, 2, . . . , V, normally with the understanding that 1. an integer v that is less than V signifies that the corresponding feature in L(C) occurs in a document exactly v times, and
2. the integer V signifies that the corresponding feature in L(C) occurs in a document at least V times.

Typically V will be 3. Note that this is a rather reasonable simplification for text categorization problems: for example, a ten-time occurrence of the word "car" is hardly more informative to predict the document being in a car related category than a nine-time occurrence. By limiting the number of possible values that may occur in components of vectors in D(C), it is possible to greatly speed up the training time, i.e., specifically, the time it takes to induce a decision tree performing the step in function block 35.

In function block 35, the set D(C) of representations of the training data is used to induce a decision tree T(C) for the category C. Over the years, a number of approaches to decision tree induction have been developed. General purpose approaches to decision tree induction may not work as well a approaches tuned to the problem of text categorization because of the special characteristics involved in text categorization. In particular, text data is characterized by very large numbers of features (as compared with other kinds of data sets used in machine learning), and numerical vectors representing text data are sparse. The preferred embodiment of the invention uses a novel approach that is a both fast and effective manner for characterization as shown in FIG. 4, which is discussed in detail below.

Figure 7:
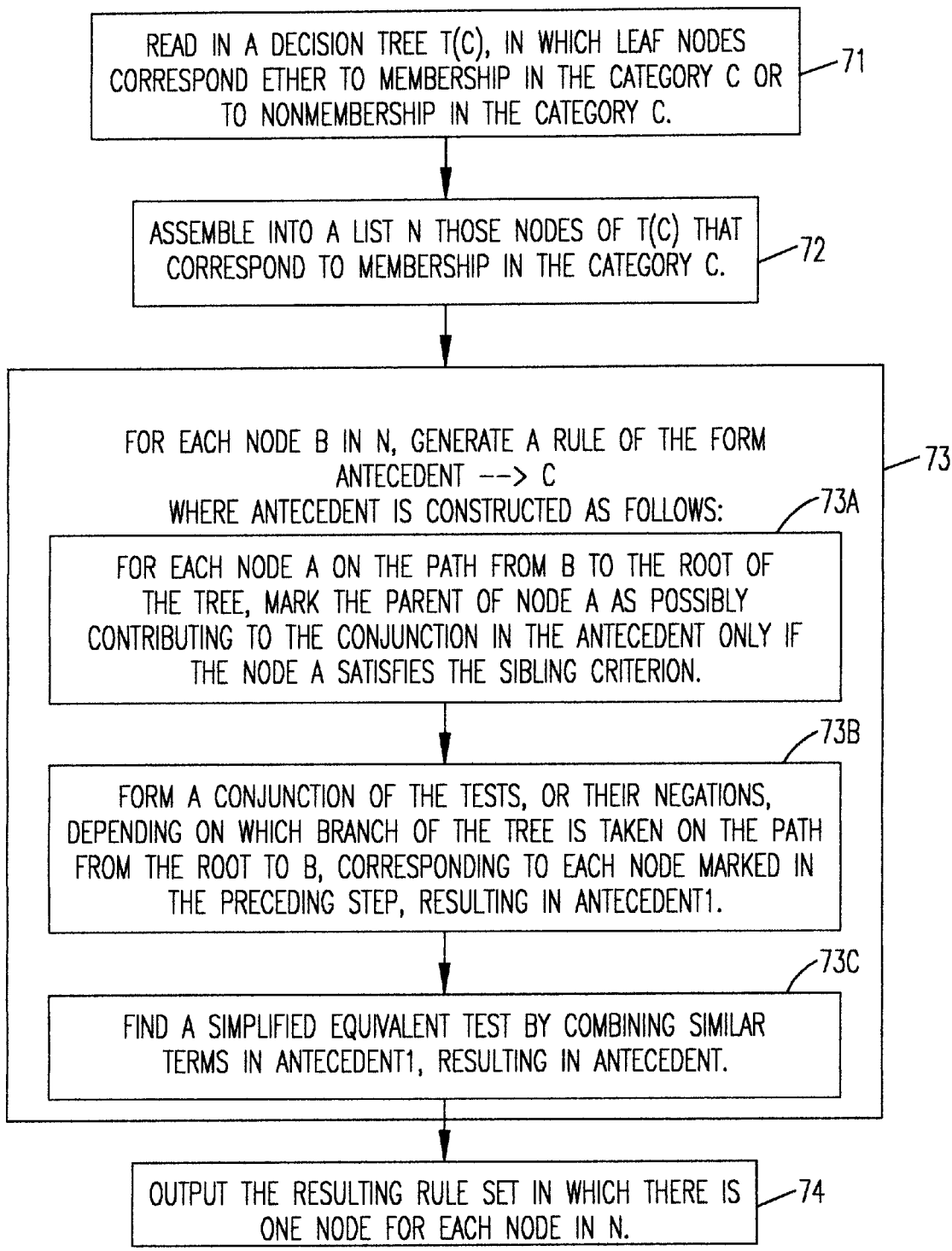
FIG. 7 shows a flow diagram for converting a decision tree to a simplified logically equivalent set of symbolic rules.

In function block 36, the decision tree T(C) is converted into a logically equivalent and a simplified set of rules R(C). An advantage of this approach is the insistence on logically equivalent rules combined with the realization that a set of rules equivalent to a decision tree need not be individually equivalent to the individual branches of the tree. The preferred method for converting a decision tree to a simplified logically equivalent set of rules is shown in FIG. 7 and discussed below.

In the preferred embodiment, the rules produced after the execution of function block 36 will not have confidence levels. Confidence levels, according the flow diagrams, are to be added to the rules in function block 16 (FIG. 1). However, it would be apparent to one skilled in the art how to add confidence levels to the rules as part of or following function block 36, in which case the need for function block 16 would be eliminated.

Finally, the rule set R(C) is output in function block 37.

The Decision Tree Induction Algorithm

A means well-suited to text data for the induction of decision trees, as shown in FIG. 4, is described below. This is also a method to accomplish the step shown in function block 35 (FIG. 3).

Outline of the Decision Tree Induction Method

Referring to FIG. 4, the first step in function block 41 for inducing a decision tree is to read the input, which consists of a category C for which decision tree is desired, and D(C), the training data suitably represented in terms of a feature set L(C) deemed relevant to the determination of document membership in the category C.

The tree is then grown in function block 42 which is described below. The tree is then pruned in function block 43, also described below. Finally, a decision tree for a category is output in function block 44.

Unique Aspects of this Method

Mathematically, each document $D_i$ is transformed into a vector $x_i=(x_{i,1}, \ldots, x_{i,d})$ of feature occurrences, where d denotes the dimension of the vector space. For each category, it is desired to determine a label $\gamma_i \in \{0,1\}$ so that $\gamma_i=1$ indicates that the document belongs to the category, and $\gamma_{i=0}$ indicates that the document does not belong to the category.

The dimension d of the input vector space x is huge for text categorization problems: usually a few hundred to a few thousand words (features) are required to achieve good performance. On the other hand, each document length, especially for e-mail applications, is on average quite short. This implies that the data vector x is very sparse in nature.

However, traditional tree construction algorithms (such as C4.5as described in J. Ross Quinlan, "C4.5 Programs for Machine Learning" (Morgan Kaufmann 1993) or CART as described in L. Breiman, J. H. Friedman, R. A. Olshen, and C. J. Stone, "Classification and Regression Trees (Wadsworth Advanced Books and Software, Belmont, Calif. 1984)) were not designed for sparse data. The preferred embodiment uses a fast decision tree algorithm developed specifically for text categorization applications, as described below. This algorithm will be understood by one skilled in the art with a basic knowledge of decision tree generation algorithms. Differences between the preferred algorithm and the standard procedures, such as described in the C4.5 and CART references will be elaborated upon.

Similar to a standard decision tree construction algorithm, the present algorithm contains two phases: tree growing and tree pruning. Three major innovations in the present method are described in more detail, below.

1. In growing the tree, advantage is taken of the sparse structure.
2. Also in growing the tree, modified entropy is used in defining an impurity measure for nodes of the tree.
3. Tree smoothing is used to do pruning.

Tree Growing: Using Modified Entropy

A greedy algorithm is employed to grow the tree. At each node corresponding to a subset T of the training data, a feature f is selected and a value v so that data in T is partitioned into two subsets $T^1$ and $T^2$ based on whether $x_{i,f} \leq v$: $T_{f,v}^1 = \{x_i \in T: x_{i,f} \leq v\}$ and $T_{f,v}^2 = \{x_i \in T: x > v\}$. This partition corresponds to a decision rule based on whether the word corresponding to feature f occurs more than v times in document d, represented by vector $x_i$.

Let $p_{f,v}^1 = P(y_i = 1 \mid x_i \in T_{f,v}^1)$, $p_{f,v}^2 = P(y_i = 1 \mid x_i \in T_{f,v}^2)$, and $$p_{f,v} = P(x_i \in T_{f,v}^1 \mid x_i \in T).$$

Consider the following transform of probability estimate $$r:[0,1] \to [0,1]$$

defined as $$r(p) = \begin{cases} \frac{1}{2}(1 + \sqrt{2p-1}) & \text{if } p > 0.5 \\ \frac{1}{2}(1 - \sqrt{1-2p}) & \text{if } p \leq 0.5, \end{cases} \quad (1)$$

Then a modified entropy for $p \in [0,1]$ is defined as $$g(p) = -r(p)\log(r(p)) - (1-r(p))\log(1-r(p)). \quad (2)$$

Figure 5:
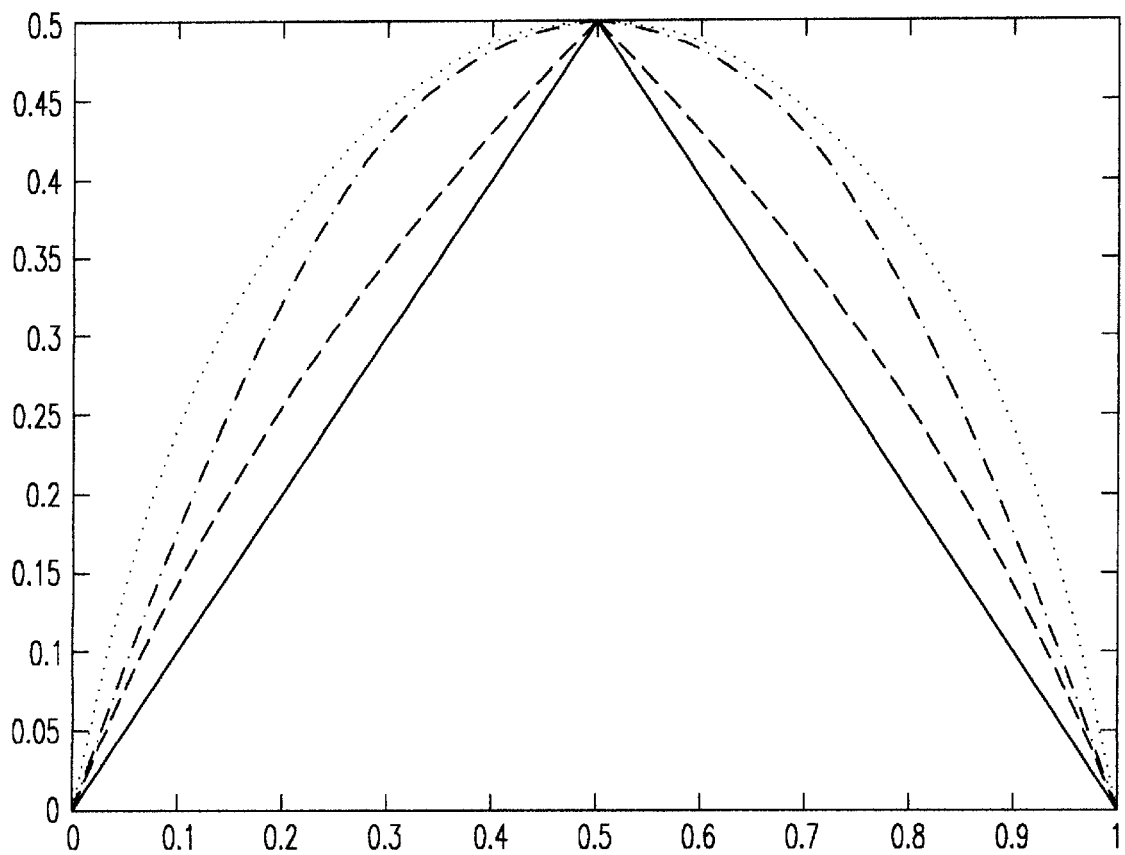
FIG. 5 shows the graphs of several different functions that can be used to define impurity criteria, in which the graph of classification error is the solid line, the graph of modified entropy is the dashed line, the graph of the Gini index is the clash-dotted line, and the graph of entropy is the dotted line.

Each possible split, (f,v), is associated with a cost function $$Q(f,v) = p_{f,v} g(p_{f,v}) + (1-p_{f,v}) g(p_{f,v}^2) \quad (3)$$

which measures the impurity of the split. The modified entropy criterion is plotted in FIG. 5 as a function of p, where it is compared with classification error, Gini index (using 2p(1−p) as the definition of the Gini index at p) and the standard entropy metric. Note that the strict concavity of the modified entropy criterion indicates that it favors a split that enhance the purity of the partition, which is similar to the Gini index and the entropy criterion.

Due to the flatness (non-strict concavity) of classification error function, it does not favor a partition that enhances the purity. Consider an example such that $p_{f,v} = 0.5$, $p_{f',v} = 0.51$ and $p_{f,v} = 0.89$, and $p_{f',v} = 1$, $p_{f',v} = 0.7$ and $p_{f',v} = 0$.

The (f',v') partition is equivalent to no partition. Clearly, the classification error criterion gives equal scores for both partitions since they all predict y=1 for all data in T. However, in reality, (f, v) should be preferable since it makes some progress: it is likely $T_{f,v}^1$ can be further partitioned so that part of the data will be associated with a probability of y=1 smaller than 0.51, and hence the prediction can be changed from 1 to 0 for those data. This future prospect of making a different prediction (increased purity of part of the data) is not reflected in the classification error criterion. This is why it is a bad measure for building a decision tree.

This problem can be remedied by using a strictly concave, bell-shaped function. However, the widely adopted entropy and Gini index criteria have shapes too different from the classification error curve. Since the final criterion for evaluating a tree is by its classification performance, it is therefore known that a tree with small entropy or Gini index does not automatically guarantee a small classification error. The modified entropy is introduced to balance the advantage of classification error which reflects the final performance measurement of the tree and the advantage of the entropy criterion which tries to enhance the prospect of good future partition within a greedy algorithm setting. It is designed to be a strictly concave function that closely resembles classification error. Note that similar to the classification error function, the modified entropy curve is also non-differentiable at p=0.5. It has been empirically shown that from experience with the present invention that this criterion consistently outperforms the entropy and the Gini index criteria for text categorization problems of interested. Although this rationale for the use of modified entropy is based reasoning involving classification error, in practice the use of modified entropy has led to excellent performance on text categorization problems, as measured by precision and recall.

Tree Growing: Using Sparse Structure in Text

It shown below how to take advantage of the sparse structure presented in text documents to select the best partition. In order to speed up the algorithm, another important assumption is made: that is, the word count $x_{i,j}$ is truncated to be at most a value V>0 (typically, this value selected to be between 3 and 10). Let d be the dimension of x which indicates the number of features (words) under consideration. An array inclass-count[1 . . . d][0 . . . V] is chosen, where inclass-count[f][v] is the number of documents $x_i \in T$ such that $y_i = 1$ and $x_{i,f} = v$; and an array total-count[1 . . . d][0 . . . V], where total-count[f][v] is the number of documents $x_i \in T$ such that $x_{i,f} = v$. The time required to create and fill the table is $O(|T| \cdot \bar{l}_T + dV)$, where $\bar{l}_T$ is the average non-zeros of $x_i \in T$. This can be achieved by going through all the non-zeros of vectors $x_i \in T$ and increase the count of the corresponding entries in the inclass-count and the total-count arrays.

The total number of $x_i \in T$ are accumulated such that $x_{i,f} \leq v$ and the total number of $x_i \in T$ such that $y_i = 1$ and $x_{i,f} \leq v$. This is done using a loop of f=1 to d, and for each f, v goes from 0 to V. The probability $p_{f,v}$, $p_{f,v}$ and $p_{f,v}$ can then be estimated to compute the cost Q(f, v) defined in equation (3). The partition (f, v) that gives the minimum cost is kept. This step requires O(dV) operations.

For the tree growing stage, the tree is recursively split starting from the root node that contains all documents, until no progress can be made. Assuming the documents roughly have equal length $\bar{l}$, then the total time required to grow the tree is roughly $O(nh_i \bar{l} + dV\,M)$, where M is the number of nodes in the tree, n is the total number of documents and $h_i$ is the average depth of the tree per document. The dominant factor in $O(nh_i \bar{l} + dV\,M)$, is the first term $O(nh_i \bar{l})$. As a comparison, a dense tree growing algorithm will have complexity at least of $O(nh_i d)$, which, in practice, is usually at least ten (10) times slower.

Tree Pruning Using Smoothing

Many algorithms for constructing a decision tree from data involve a two-stage process: the first stage is to grow a tree as large as possible to fit the data using procedures similar to what we have described in the previous section. After this stage, the tree typically "over-fits" the data in the sense that it may have a poor performance on the test set. Therefore a second phase is required to prune the large tree so that the smaller tree gives more stable probability estimates, which lead to better performance on the test set.

In this subsection, a procedure for tree smoothing used in the preferred embodiment of the present invention is described, which instead of pruning the fully grown tree, re-estimates the probability of every leaf node by averaging the probability estimates along the path leading from the root node to this leaf node. To achieve this, the "tree-weighting" idea is borrowed from data compression applications (see F. M. J. Willems, Y. M. Shtarkov, and T. J. Tjalkens, "The context Tree Weighting Method: Basic Properties", in *IEEE Transactions on Information Theory*, 41(3) pp. 653–664, 1995, and T. Zhang, "Compression by Model Combination", in *Proceedings of IEEE Data Compression Conference*, DCC '98, pp. 319–328, 1998). If the tree is used for compression of the binary class indicator string $y_i$ based on $x_i$, then the tree-weighting scheme guarantees that the re-estimated probability achieves a compression ratio not much worse than that of the best pruned tree (see "The context Tree Weighting Method: Basic Properties" and "Compression by Model Combination", supra). Since this method is applied to the transformed probability estimate r(p) rather than top directly, this theoretical result can be interpreted non-rigorously as: by using the re-estimated probability, one can achieve an expected classification performance on the test set not much worse than that of the best pruned tree.

Note that in statistics, this technique is also called "shrinkage" that shrink the estimate from a node deeper in the tree (which has a lower bias but higher variance since there are fewer data points) toward estimates from nodes shallower in the tree (which have higher biases but lower variances). In Bayesian statistics and machine learning, this method is also called model averaging. See B. Carlin and T. Louis, "Bayes and Empirical Bayes Methods for Data Analysis", (Chapman and Hall 1996), for more discussions from the statistical point of view.

Basically, the present invention can be described as follows: consider sibling nodes $T_1$ and $T_2$ with a common parent T. Let $p(T_1)$, $p(T_2)$ and $p(T)$ be the corresponding probability estimates. The local re-estimated probability is $w_T p(T)+(1-w_T)p(T_1)$ for $T_1$ and $w_T p(T)+(1-w_T)p(T_2)$ for $T_2$. The local weight $w_T$ is computed recursively based on the following formula:

$$\frac{w_T}{1-w_T} = \frac{c \cdot \exp(-|T|g(p(T)))}{\exp(-|T_1|G(T_1) - |T_2|G(T_2))},$$

where $$G(T) = \begin{cases} g(p(T)) + \frac{1}{|T|}\log\left(\left(1 + \frac{1}{c}\right)w_T\right) & \text{if } w_T > 0.5, \\ \frac{|T_1|}{|T|}G(T_1) + \frac{|T_2|}{|T|}G(T_2) + \frac{1}{|T|}\log((1+c)(1-w_T)) & \text{otherwise.} \end{cases}$$

where c is a prior that encodes the Bayesian "cost" of splitting. For a leaf node T, $G(T)=g(p(T))$ and $w_T=1$ is defined. In the preferred method, c=16, but the performance is not very sensitive to this parameter. The above formula for $G(T)$ is equivalent to $$G(T) = -\frac{1}{|T|}\log\left[\frac{c}{1+c}\exp(-|T|g(p(T))) + \frac{1}{1+c}\exp(-|T_1|G(T_1)-|T_2|G(T_2))\right].$$

The formula for $w_T$ is derived from the Bayesian model averaging method locally at each node (note the probability p is replaced at a node with its transformed estimate r(p)). From bottom up, the local probability at each node is re-estimated and fed into a new probability estimate by shrinking towards its parent estimate. The quality of the re-estimate at each node T is measured by G(T), which is updated at each step based on the information gathered from its children. Therefore based on G(T), the local relative importance of the current node compared to its children can be computed, i.e., $w_T$.

After calculating the weight $w_T$ for each node recursively (the computation is done bottom-up), the global re-estimated probability for each tree node is computed from top-down. This step averages all the estimates r(p) from the root node $T_0$ to a leaf node $T_h$ down a path $T_0 \ldots T_h$, based on weight $w_T$. Note that weight $w_T$ is only the local relative importance, which means that the global relative importance of a node $T_k$ is $\tilde{w}_k = \Pi_{i<k}(1-w_i)w_k$ along the path. By definition, $$\sum_{i=1}^{h} \tilde{w}_i = 1$$

for any path leading to a leaf. The following recursive procedure efficiently computes the global re-estimate of the children $T_1$ and $T_2$ at the parent node T:

$$\tilde{w}_{T_e} = \hat{w}_T(1-w_T) \quad (4)$$

$$\tilde{r}(T_i) = \tilde{r}(T) + \hat{w}_{T_e} w_{T_e} r(p(T_i)), \quad (5)$$

where r(p(T)) is the transformation (1) of the probability estimate p(T) at node T. At the root node, $\hat{w}=1$ is set. After $\hat{r}(T_h)$ has been computed for a leaf node $T_h$, then $r^{-1}(\hat{r}(T_h))$ can be used as its probability estimate. The label of $T_i$ is 1 if $\hat{r}(T_i)>0.5$ and 0 otherwise. The tree is pruned bottom up by checking whether two siblings give identical labels; if so, they are removed and the label for their parent is used. This procedure continues until further processing is not possible. Typically, for a large fully grown tree from the first stage, the pruned tree can be as little as 10% of the unpruned tree.

The smoothing procedure consistently enhances the classification performance of the tree. The running time is O(M) where M is the number of nodes in the unpruned tree. Therefore the total complexity of the decision tree construction algorithm of the present invention is $O(nh_j\bar{l}+dV M)$. As described above, in practice, a complexity $O(nh_j\bar{l})$ of is observed.

Turning Decision Trees Into Symbolic Rule Sets

The present method of symbolic rule induction takes a decision tree obtained by supervised learning for the purpose of categorizing text and employs a computer program to transform the tree into a mathematically equivalent set of logical rules to be used for the same purpose.

Rationale

The value of converting decision trees into simplified logically equivalent symbolic rule sets, instead of employing a text categorization system based solely on decision trees, is threefold:

1. A system based solely on generating decision trees from training data is useless for categories for which there is no training data. However, it is not hard for an intelligent person to write logical rules to cover such a situation. Creating a decision tree by hand for the purpose of text categorization would be much more difficult, particularly for one who is not mathematically sophisticated. It is envisioned that handwritten rule sets could be seamlessly incorporated with machine-generated rule sets, either permanently or as a stopgap measure pending the collection of additional training data.

2. A human user can understand and modify a rule set much more easily than the user can understand and modify a decision tree. There are a number of scenarios in which the need for such modifications is envisioned. For instance, there may be a discrepancy between the training data and the anticipated application that may require manual modification of an automatically created system, and in a system such as the one we are describing, this modification may be accomplished by editing a rule file. Another scenario involves a user's desire to update an existing system in order to improve performance that may have degraded, due to a changing environment or perhaps due to the introduction of new terminology or new products related to a category, without fully recreating the system from scratch.

3. The fact that a rule set is logically equivalent to a corresponding decision tree for a particular text categorization problem guarantees that any mathematical analysis relating to the performance of the decision tree with respect to text categorization carries over to the rule set. This would not be true if a rule set only approximated a decision tree, as would be the case if the rule set were derived from the decision tree by heuristics.

A computer program is necessary to convert decision trees to rule sets because, in typical applications, the decision trees can quite large (containing dozens or hundreds of tests). Moreover, for most text categorization tasks, the solution will need many decision trees, normally one for each category.

Techniques for Creating Logically Equivalent Rule Sets

Creating logically equivalent rule sets can be performed in a variety of ways. The method of the preferred embodiment of the present invention uses algorithmic methods to create a rule set equivalent to a decision tree, all the while preserving logical equivalence, and often leading to simplifications.

Figure 6:
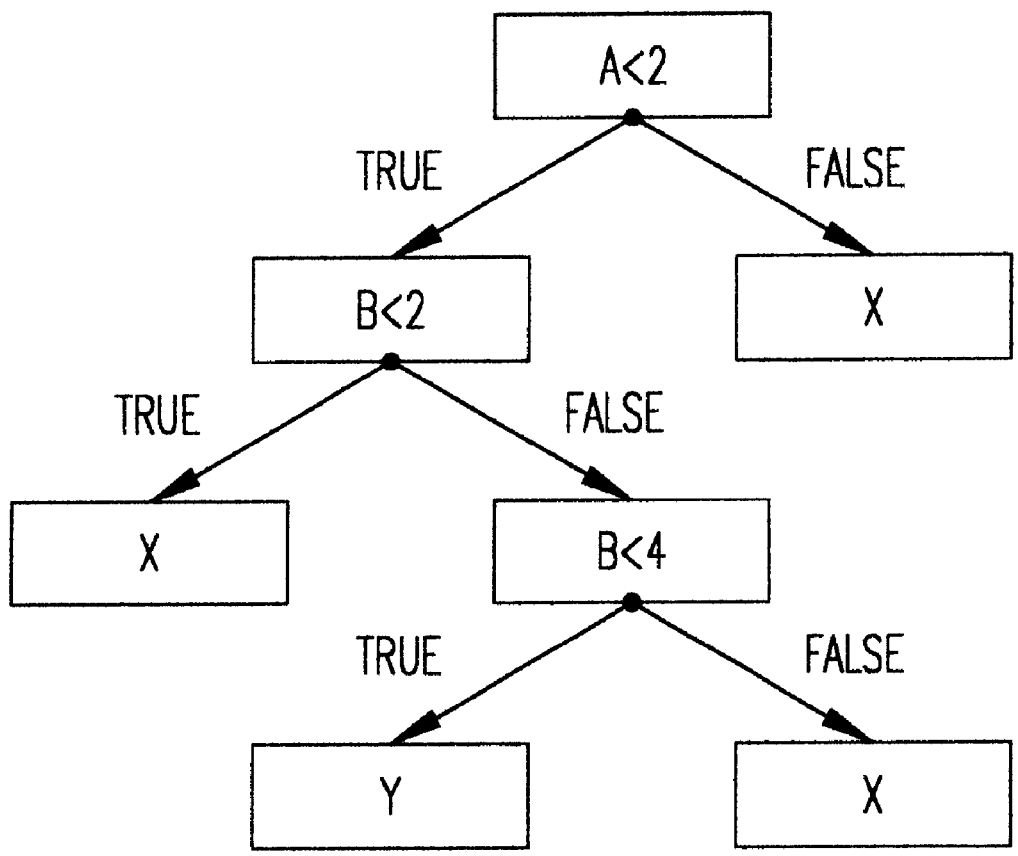
FIG. 6 shows a simple decision tree for determining if a data object is in a category X, in which various simple tests are associated with the non-leaf nodes of the tree, in which either the category X or its complement (denoted Y) is associated with each leaf node, and in which the tree as whole is logically equivalent to the simplified rule set $(B<2) \rightarrow X, (B>4) \rightarrow X, (A>2) \rightarrow X;$

As an example, FIG. 6 is a depiction of a simple decision tree for deciding if a document is in category X, on the basis of numerical scores for features A and B that can be extracted from a document. Here an occurrence of X at a leaf of the tree indicates membership in the class of interest and Y indicates non-membership.

In particular, decision trees are binary trees with one branch to be taken when the test at a node is true and the other branch to be taken when that test is false. As a consequence, the only node in a decision tree that does not have a sibling is the root. This observation is needed to fully comprehend the Sibling Criterion given later in this section.

The most straightforward way to convert a tree into an equivalent set of rules is to create a set with one rule for each leaf by forming the logical conjunction of the tests on the unique path from the root of the tree to the leaf. Thus, reading $\Lambda$ as "and," a set of four rules equivalent to the decision tree in FIG. 6 is $$(A<2)\Lambda(B<2)\rightarrow X(A<2)\Lambda(B\geq 2)\Lambda(B<4)\rightarrow Y(A<2)\Lambda(B\geq 3)\Lambda(B\geq 4)\rightarrow X(A\geq 2)\rightarrow X$$

Note that the exact form of each test that appears in a rule depends on whether the "true" branch or the "false" branch was taken in going from the root to the leaf.

The first simplification possible is that, in a text categorization situation, one is almost surely interested only in rules for X, and not its complement Y, so we can simplify the rule set for the example decision tree as $$(A<2)\Lambda(B<2)\rightarrow X(A<2)\Lambda(B\geq 3)\Lambda(B\geq 4)\rightarrow X(A\geq 2)\rightarrow X$$

Logically, nothing is lost in this simplification because a document is presumed to be in class Y only if no rule places it in class X.

The second simplification possible is based on logically combining similar terms in a conjunct. For instance, such simplification is possible in the second rule above, with the simplified rule set being $$(A<2)\Lambda(B<2)\rightarrow X(A<2)\Lambda(B\geq 4)\rightarrow X(A\geq 2)\rightarrow X$$

because the condition $(B\geq 3)\Lambda(B\geq 4)$ is logically equivalent to the condition $B\geq 4$. One can also say that in the rule $$(A<2)\Lambda(B\geq 3)\Lambda(B\geq 4)\rightarrow X$$

the condition $B\leq 3$ is logically superfluous. Sometimes in finding a logically equivalent simplification, one can take advantage of knowing that variables are restricted to integer values. Thus, knowing that B were an integer allows the rule to be represented more simply as $$(B=4)\rightarrow X$$

instead of the more complex, but logically equivalent rule of $$(B>3)\Lambda(B<5)\rightarrow X.$$

Also under the assumption that the values of B are nonnegative integers, $$(B=0)\rightarrow X$$

is logically equivalent to, $$(B<1)\rightarrow X.$$

It is straightforward to write a computer program to construct logically equivalent simplifications of rules of these kinds.

The third simplification possible is the alteration of the rule set by the deletion of conditions that are superfluous in the context of the entire rule set, but which change the meaning of individual rules. This is possible because by using logical disjunction (V, read as "or"), one could combine all rules that lead to the same result. Thus, the example $$(A<2)\Lambda(B<2)\rightarrow X(A<2)\Lambda(B\geq 4)\rightarrow X(A\geq 2)\rightarrow X$$

reduces three rules to one:

$$((A<2)\Lambda(B<2))V((A<2)\Lambda(B\geq 3)\Lambda(B\geq 4))V(A\geq 2)\rightarrow X.$$

The above observation shows that the question of the best form for a rule set is really a question of choosing between different disjunctive normal forms for logical expressions. By switching to an equivalent disjunctive normal form, and then creating a rule for each disjunct, it should be possible to eliminate a part of a rule that is superfluous in the context of the other rules. In the case of the example, a simpler equivalent disjunctive normal form is $$(B<2)V(B\geq 4)V(A\geq 2)\rightarrow X$$

which, by creating a rule for each disjunct, leads to the equivalent simple rule set $$(B<2)\rightarrow X(B\geq 4)\rightarrow X(A\geq 2)\rightarrow X$$

Real-life decision trees do not often yield such simple rule sets, but this one illustrates some simplifications possible particularly well. In many cases, superfluous conditions in a rule set can be discovered by a computer-controlled inspection of the corresponding decision tree, thereby avoiding the computationally difficult problem of searching through a space of equivalent disjunctive normal forms. Here is described an algorithm that works for a decision tree for a two-class problem (i.e., each leaf node is labeled by a class X or its complement Y), where the aim is to produce rules for membership in the class X:

For each leaf labeled X, create a rule for membership in the class X by forming a conjunction of conditions obtained by traversing the path from the root to X, but only use those conditions in conformance with the following:

For each node A on a path from the root to a leaf labeled X, the condition attached to the parent of A is to be part of the conjunction only if the Sibling Criterion holds for A, where the Sibling Criterion for A is:

the node A is not the root, and the sibling node of A is not a leaf node labeled by X.

The resulting set of rules is then equivalent to the original tree.

It should be noted that the Sibling Criterion, and its use in this method, are not used in the prior art, and are novel.

If one applies the above algorithm to the decision tree in FIG. 6, one sees that for each leaf labeled X, there is only one condition on the path from the root to the leaf that is not to be omitted from the conjunction, and so one immediately obtains the equivalent rule set $$(B<2) \to X (B \geq 4) \to X (A \geq 2) \to X.$$

In general, to obtain a simplified rule set that is equivalent to a decision tree, a variety of simplification methods may be applied, of which three are described above. Simplification methods are not exclusive and may be applied in combination with one another. A particularly effective method of combination is described below.

A Particular Method for Converting a Tree to a Rule Set

FIG. 7 is a flow diagram describing the steps in generating a simplified logically equivalent symbolic rule set from a decision tree. The details should be clear in the light of the preceding discussion. The most important aspect of the method is that the elimination of tests corresponding to nodes along a path using the Sibling Criterion is to be done first, and the discovery of logically equivalent simplifications of the antecedent of a rule is to be done afterwards. The steps in function blocks 72 and 73 all contribute to the simplification of the rule set. In function block 73A, some of the parents of nodes on a path from a leaf are marked. Note that, the root of the tree does not satisfy the Sibling Condition because it has no sibling. With this method, there are as many rules produced as there are leaves in a category corresponding to membership in a particular category, but an individual rule is not necessarily logically equivalent to a path from the root to a leaf of the decision tree.

First, the decision tree T(C) is read in function block 71. The leaf nodes of the decision tree correspond to either membership in the category C or to non-memberships in the category C. Those node of T(C) that correspond to membership in the category C are assembled into a list N in function block 72.

Then, for each node B in N, a rule of the form

ANTECEDENT→C is generated, where the ANTECEDENT is constructed by performing the steps in function blocks 73A, 73B and 73C. For each node A, on the path from B to the root to the root of the tree, the parent of node A is marked as possibly contributing to the conjunction in the ANTECEDENT only if the node A satisfies the Sibling Criterion, in function block 73A. In function block 73B, a conjunction of the tests, or their negations is formed, depending on which branch of the tree is taken on the path from the root to B, corresponding to each node marked in the preceding step, resulting in ANTECEDENT1. In function block 73C, a simplified equivalent test is found by combining similar terms in ANTECEDENT1, resulting in ANTECEDENT.

Finally, the resulting rule set is output in function block 74 in which there is one node for each node in N.

Categorizing Documents Using a Decision-Tree Based Symbolic Rule Set

FIG. 8 shows the steps to be taken by a computer to use a set of rules for membership in a category, the rules being, in the format of those produced by a decision-tree-based symbolic rule induction system (i.e., possibly with confidence levels) for the purpose of predicting whether or not a document is a member of that category, delivering a confidence level with that prediction. The steps given are straightforward, with the primary innovation being the use of rules that may contain confidence levels, with the use of a default confidence level to be used in case no confidence level is present in a rule.

First, the RuleSet is read in function block 81. The RuleSet is a set of rules in the format induced by a decision-tree based symbolic rule induction system to be used for text categorization, for instance, as described above. Any information relevant to using RuleSet for text categorization is also read. If there are any rules missing confidence levels, then a default confidence level to be used is also read. The subject document d is then read in function block 82.

A representation r of document d is created in function block 83 in a manner corresponding to that used in the processing of the training data that induced RuleSet. The representation r is categorized using RuleSet in function block 84 by returning all categories and confidence levels from rule whose antecedent is true, when applied to r.

Experimental Results

The methods described above have been implemented in a prototype text categorization system called KitCat, which is short for a "tool kit for text categorization." The name "DTREE" is used for this implementation of the decision tree induction method, and it is a component of KitCat.

One of the most common data sets used for comparing categorizers is the Reuters-21578 collection of categorized newswires, which can be obtained from http://www.research.att.com/~lewis/reuters21578.html. The Mod-Apte data split was used which gives a training set with 9603 items and a test set with 3299 items. Training on 93 categories, the best results were micro-averaged precision of 87.0 percent and recall of 80.5 percent, the average being 83.75 percent. In this run, 500 features were selected, no stopwords list was used, and features from different sections were not combined. The training time for the DTREE decision tree induction algorithm on the Reuters data set above was 80 seconds on a 400 MHZ Pentium II.

DTREE compares very favorably with results using the C4.5 decision tree induction algorithm. For additional comparison, a linear least squares fitting (LLSF) algorithm was also implemented. LLSF on the Reuters data, prepared as described above, did not perform as well as DTREE. LLSF gave precision of 86.3 percent and recall of 79.3 percent, with an average of 82.8 percent. If one were willing to make the major sacrifice of giving up human-readable and human-modifiable rules, one could do better than DTREE alone by using boosting (i.e, adaptive resampling, with the accompanying generation of multiple trees). The best results reported using the Reuters data were achieved with boosted decision trees, as indicated in S. M. Weiss, C. Apte, F. J. Damerau, D. E. Johnson, F. J. Oles, T. Goetz, and T. Hampp, "Maximizing Text-Mining Performance", *IEEE Intelligent Systems*, 14(4) pp. 63–69, 1999. DTREE has been used with boosting, generating 10 trees and selecting 1000 features, with resulting precision of 89.0 percent and recall of 84.0 percent, with an average of 86.5 percent.

KitCat was applied to categorize email sent to a large bank. There were 4319 e-mails, with 3943 used for training and 970 used for testing. Nine (9) categories were used, covering 86 percent of the data. The rules produced by KitCat had a micro-averaged precision of 92.8 percent and a micro-averaged recall of 86.1 percent. To get such good results, the original categorization scheme was re-adjusted by amalgamating "confusing" categories. While this might sound suspect from an academic point of view, it reflects the reality that data is rarely categorized at the outset with the needs of machine learning in mind. Instead, existing categorization schemes often arise in a haphazard manner, and reconstructing one to get the right scheme is part of solving the problem.

Applications used with KitCat illustrate that it works very well on "dirty" data. Detailed analysis shows the rules produced for classifying e-mail are quite good, even when the tester initially reports the contrary. On four (4) categories in a customer data set with less than stellar results as measured by the test data, KitCat rules actually were seen to have 100 percent precision, after the data was carefully reexamined. The persons who initially did the categorization had precision ranging from 50.0 to 83.3 percent on these categories. There were 84 instances of these categories out of 8895 documents in the test set. Thus, mis-classified test data can make even good rules look bad. However, bad data is a fact of life, and robustness in its presence is one of KitCat's advantages.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method for generating decision-tree-based symbolic rule induction for general text categorization, wherein the text categorization provides superior performance in the areas of precision, recall multiple categorization, provision of confidence levels, training speed, and insight and control, said method comprising the steps of:

accepting training data, the data comprising a set of training documents, wherein a document is any data item containing text;

creating a set TR of representations of the set of training documents, the representation being suitable for rule induction and being in terms of counts of occurrences of features in documents;

for each category C, generating R(C), a decision-tree-based set of symbolic rules;

combining the generated rule sets R(C) for all categories C into a single rule set, "RuleSet";

computing a confidence level for each rule in RuleSet;

adding the computed confidence level to the corresponding rule; and generating a final RuleSet comprising rules and corresponding confidence levels.

2. A method as recited in claim 1, wherein the step of generating R(C), a decision-tree-based set of symbolic rules for a category C, further comprises the steps of:

a) growing the decision tree starting from a root node corresponding to the set of all training documents by recursively splitting the set of training documents corresponding to a node under consideration, the first such node being the root node, into two subsets of documents, each subset of documents corresponding to a child of the node under consideration being split until no further progress can be made, where a minimum cost partition is used for each split; and b) pruning the decision tree using tree smoothing.

3. A method as recited in claim 2, wherein the minimum cost partition at a node is computed from two 2-dimensional arrays, "inclass-count[f][v]" and "total-count[f][v]", wherein inclass-count[f][v] is a quantity of documents at a current node under consideration that are in a class C and for which a truncated count of occurrences of feature f is v, and total-count[f][v] is a total quantity of documents at the current node under consideration for which the truncated count of occurrences of feature f is v, where f is an integer in the range of 1 to d and v is an integer in the range 1 to V, and where d is a quantity of all features under consideration and V is selected as a maximum count recorded for the number of occurrences of a particular feature in a document.

4. A method as recited in claim 3, wherein V is in the range of 3 to 10.

5. A method as recited in claim 1, wherein the confidence level for each rule in RuleSet is computed using a precision of each individual rule as measured on a set of data which has been labeled with categories, wherein the data set used is one of the training data used for rule induction and a separate data set selected for measuring confidence levels of the rules.

6. A method as recited in claim 1, wherein determination of the confidence levels for rules does is performed concurrently with the step of combining the generated rule sets R(C) for all categories C.

7. A method as recited in claim 1, wherein the step of creating a set TR of representations of the set of training documents, further comprises the steps of:

inputting a document d;

segmenting the document d into sections, the sections being significant for categorization;

tokenizing each section of the document d that contains text; and generating a representation r of the tokenized document d from which a list of tokens in each section is determined.

8. A method as recited in claim 7, further comprising the step of performing at least one of:

(i) converting all tokens to canonical form; and (ii) deleting stopwords not useful for categorization.

9. A method as recited in claim 1, wherein the step of generating R(C) further comprises the steps of:

specifying a category C for which a set of decision-tree-based symbolic rules is to be induced;

inputting a set TR of representations of tokenized training documents, each representation having a set of features;

creating a list L(C) of features selected from the collection of all features occurring in the TR in order to construct a representation of each document that is specific to the category C;

creating a set D(C) of category specific representations of tokenized training documents based on the list L(C) of selected features;

inducing a decision tree T(C) for the category C; and converting the decision tree T(C) into a logically equivalent set of rules R(C).

10. A method as recited in claim 9, wherein the representation of a document specific to the category C is a numerical vector representation of the document, where each component of the numerical vector is a numerical value corresponding to a single specific feature in L(C).

11. A method as recited in claim 10, wherein the numerical representation is limited to the numerical components of a vector to being one of the consecutive integers 0, 1, 2, . . . , V, such that:

(i) an integer θ less than V signifies that the corresponding feature in L(C) occurs in a document exactly v times, and (ii) V signifies that the corresponding feature in L(C) occurs in a document at least V times.

12. A method as recited in claim 9, wherein the decision tree T(C) is converted into a simplified set of rules.

13. A method as recited in claim 9, wherein the step of inducing a decision tree T(C), further comprises the steps of:

inputting a category C and the set D(C) of category specific representations of tokenized training documents based on the list L(C) of selected features relevant to category C;

employing a greedy algorithm to grow a decision tree T(C), the tree T(C) classifying the training data, the algorithm taking advantage of sparse data using a modified entropy function to measure impurity of a split at a tree node, thereby determining a test used at a node; and pruning the decision tree T(C) by smoothing, thereby obtaining a decision tree T(C).

14. A method as recited in claim 9, wherein the step of converting the decision tree T(C) into a logically equivalent set of rules R(C), further comprises the steps of:

inputting a decision tree T(C) where leaf nodes correspond to one of membership in the category C and to non-membership in the category C;

assembling into a list N those nodes of T(C) corresponding to membership in category C; and for each node B in N, generating a rule of the form: ANTECEDENT→C.

15. A method as recited in claim 14, wherein construction of the ANTECEDENT comprises the steps of:

for each node A, on a path from B to the root of the tree, marking the parent of node A as possibly contributing to the conjunction in the ANTECEDENT only if node A satisfies Sibling Criterion;

forming a conjunction of tests, or negations of the tests, depending on which branch of the tree is taken on the path from the root to B, corresponding to each node marked in the marking step, resulting in ANTECEDENT1; and identifying a simplified equivalent test by combining similar terms in ANTECEDENT1, resulting in ANTECEDENT.

16. A method of categorizing text using decision-tree-based symbolic rule induction categorization rules, said method for categorization comprising the steps of:

inputting a rule set, "RuleSet", the rule set being a set of rules formed by induced decision-tree-based symbolic rule induction, inputting a document d;

creating a representation r, of document d, in a manner corresponding to the step of creating a set of representations of a set of training documents as used in rule induction resulting in RuleSet; and returning all categories and confidence levels from selected rules in RuleSet, wherein the selected rules have a true antecedent when applied to r, thereby resulting in a categorization of r, wherein the rules of RuleSet are induced by:

accepting training data, the data comprising a set of training documents, wherein a document is any data item containing text, creating a set TR of representations of the set of training documents, the representation being suitable for rule induction, for each category C, generating R(C), a decision-tree-based set of symbolic rules, combining the generated rule sets R(C) for all categories C into a single rule set, "RuleSet", computing a confidence level for each rule in RuleSet, adding the computed confidence level to the corresponding rule, and generating a final RuleSet comprising rules and corresponding confidence levels.

17. A system for generating decision-tree-based symbolic rule induction for general text categorization, wherein the text categorization provides superior performance in the areas of precision, recall multiple categorization, provision of confidence levels, training speed, and insight and control, comprising:

a computing device having memory, non-volatile storage, processing unit, and means for input/output;

means for accepting training data by the computing device, the data comprising a set of training documents, wherein a document is any data item containing text;

means for creating a set TR of representations of the set of training documents to be further processed by the computing device processing unit, the representation being suitable for rule induction and being in terms of counts of occurrences of features in documents;

means for generating R(C), a decision-tree-based set of symbolic rules, for each category C, wherein the generating means utilizes the set of TR representations;

means for combining the generated rule sets R(C) for all categories C into a single rule set, "RuleSet";

means for computing a confidence level for each rule in RuleSet;

means for adding the computed confidence level to the corresponding rule; and means for generating a final RuleSet comprising rules and corresponding confidence levels, wherein the final RuleSet is stored in the computing device non-volatile storage unit for later use.

18. A system as recited in claim 17, wherein the means for generating R(C), a decision-tree-based set of symbolic rules for a category C, grows the decision tree starting from a root node corresponding to the set of all training documents by recursively splitting the set of training documents corresponding to a node under consideration, the first such node being the root node, into two subsets of documents, each subset of documents corresponding to a child of the node under consideration being split until no further progress can be made, where a minimum cosr partition is used for each split; and prunes the decision tree using tree smoothing.

19. A system as recited in claim 17, wherein the confidence level for each rule in RuleSet is computed using a precision of each individual rule as measured on a set of data which has been labeled with categories, wherein the data set used is one of the training data used for rule induction and a separate data set selected for measuring confidence levels of the rules.

20. A system as recited in claim 17, wherein the means for generating R(C) specifies a category C for which a set of decision-tree-based symbolic rules is to be induced inputs a set TR of representations of tokenized training documents, each representation having a set of features; creates a list L(C) of features selected from the collection of all features occurring in the TR in order to construct a representation of each document that is specific to the category C; creates a set D(C) of category specific representations of tokenized training documents based on the list L(C) of selected features; induces a decision tree T(C) for the category C; and converts the decision tree T(C) into a logically equivalent set of rules R(C).

21. A system as recited in claim 20, wherein the means for generating R(C) induces a decision tree T(C) by inputting a category C and the set D(C) of category specific representations of tokenized training documents based on the list L(C) of selected features relevant to category C; employing a greedy algorithm to grow a decision tree T(C), the tree T(C) classifying the training data, the algorithm taking advantage of sparse data using a modified entropy function to measure impurity of a split at a tree node, thereby determining a test used at a node; and pruning the decision tree T(C) by smoothing, thereby obtaining a decision tree T(C).

* * * * *